(12) United States Patent
Lambe

(10) Patent No.: US 10,801,663 B2
(45) Date of Patent: Oct. 13, 2020

(54) SYSTEMS AND METHODS FOR SEWER MONITORING

(71) Applicant: South East Water Corporation, Frankston (AU)

(72) Inventor: Jean-Paul Lambe, Frankston (AU)

(73) Assignee: South East Water Corporation, Frankston (AU)

( * ) Notice: Subject to any disclaimer, the term of this patent is extended or adjusted under 35 U.S.C. 154(b) by 0 days.

(21) Appl. No.: 16/314,459

(22) PCT Filed: Jul. 13, 2017

(86) PCT No.: PCT/AU2017/050722
§ 371 (c)(1),
(2) Date: Dec. 31, 2018

(87) PCT Pub. No.: WO2018/009976
PCT Pub. Date: Jan. 18, 2018

(65) Prior Publication Data
US 2019/0154196 A1    May 23, 2019

(30) Foreign Application Priority Data

Jul. 15, 2016 (AU) ................................. 2016902783

(51) Int. Cl.
*F16M 13/02* (2006.01)
*F16M 11/20* (2006.01)
(Continued)

(52) U.S. Cl.
CPC .......... *F16M 13/022* (2013.01); *F16M 11/06* (2013.01); *F16M 11/14* (2013.01);
(Continued)

(58) Field of Classification Search
CPC ...... F16M 13/022; F16M 11/06; F16M 11/14; F16M 11/2085; F16M 11/22;
(Continued)

(56) References Cited

U.S. PATENT DOCUMENTS 5,811,688 A    9/1998  Marsh et al.
2006/0280657 A1*  12/2006  Farina .................... G01D 11/30
                                                                        422/400

(Continued)

FOREIGN PATENT DOCUMENTS

WO        2016/033653 A1       3/2016
WO    WO-2016033653 A1 *   3/2016   ............. E02D 29/12

OTHER PUBLICATIONS

Oct. 3, 2017—ISR & Written Opinion for PCT/AU2017/050722.

*Primary Examiner* — Mohamed Barakat
(74) *Attorney, Agent, or Firm* — Banner & Witcoff, Ltd.

(57) ABSTRACT

A sensor unit support structure for supporting a sensor unit in a manhole. The support structure comprises an elongate beam adjustable along its length to span a width of the manhole and support the sensor unit within the manhole. The support structure further comprises first and second mounting brackets associated with respective first and second ends of the beam, each mounting bracket being configured to fasten the beam to an inner surface of the manhole. The support structure further comprises first and second temporary brackets associated with respective first and second mounting brackets. The first and second mounting brackets are configured to be removably coupled to the respective first and second temporary brackets, each temporary bracket being configured to engage a rim of the manhole to allow the first and second mounting brackets to be positioned in the manhole and temporarily supported in position until the mounting brackets are fastened to the inner surface of the manhole.

18 Claims, 6 Drawing Sheets

(51) Int. Cl.
  *G01F 1/00* (2006.01)
  *G01F 23/296* (2006.01)
  *G01F 1/66* (2006.01)
  *F16M 11/06* (2006.01)
  *G01D 11/30* (2006.01)
  *F16M 11/14* (2006.01)
  *F16M 11/22* (2006.01)
  *G01F 15/18* (2006.01)
  *G08B 21/18* (2006.01)
  *G01F 23/00* (2006.01)

(52) U.S. Cl.
  CPC ......... *F16M 11/2085* (2013.01); *F16M 11/22* (2013.01); *G01D 11/30* (2013.01); *G01F 1/002* (2013.01); *G01F 1/66* (2013.01); *G01F 1/662* (2013.01); *G01F 15/18* (2013.01); *G01F 23/296* (2013.01); *G08B 21/182* (2013.01); *G01F 23/00* (2013.01)

(58) Field of Classification Search
  CPC . G01D 11/30; G01F 1/002; G01F 1/66; G01F 1/662; G01F 15/18; G01F 23/296; G01F 23/00; G08B 21/182
  See application file for complete search history.

(56) References Cited

U.S. PATENT DOCUMENTS

| | | | |
|---|---|---|---|
| 2007/0103324 A1* | 5/2007 | Kosuge | E03F 7/00 340/618 |
| 2009/0201123 A1 | 8/2009 | Kafry et al. | |
| 2010/0201514 A1* | 8/2010 | Barna | H02J 13/0079 340/539.22 |
| 2013/0125500 A1* | 5/2013 | McGrath | E04B 9/245 52/741.1 |
| 2013/0168957 A1* | 7/2013 | Kaplan | F16L 27/04 285/146.1 |
| 2014/0174170 A1* | 6/2014 | Davis | A46B 9/028 73/170.16 |
| 2015/0090049 A1* | 4/2015 | Kertesz | H01M 2/1022 73/861.18 |

* cited by examiner

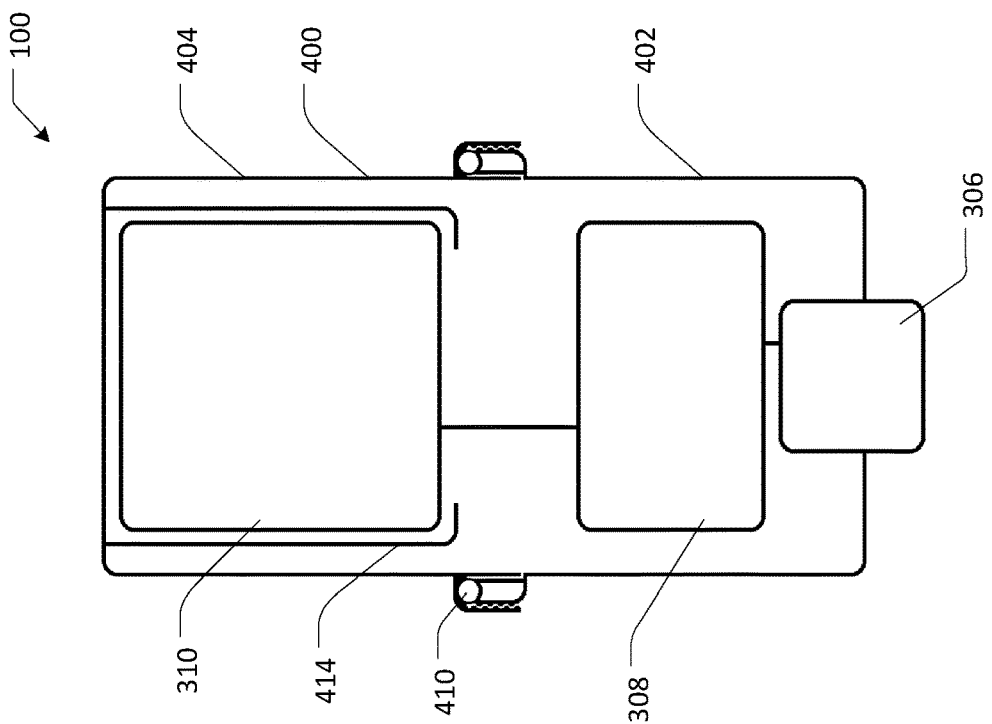
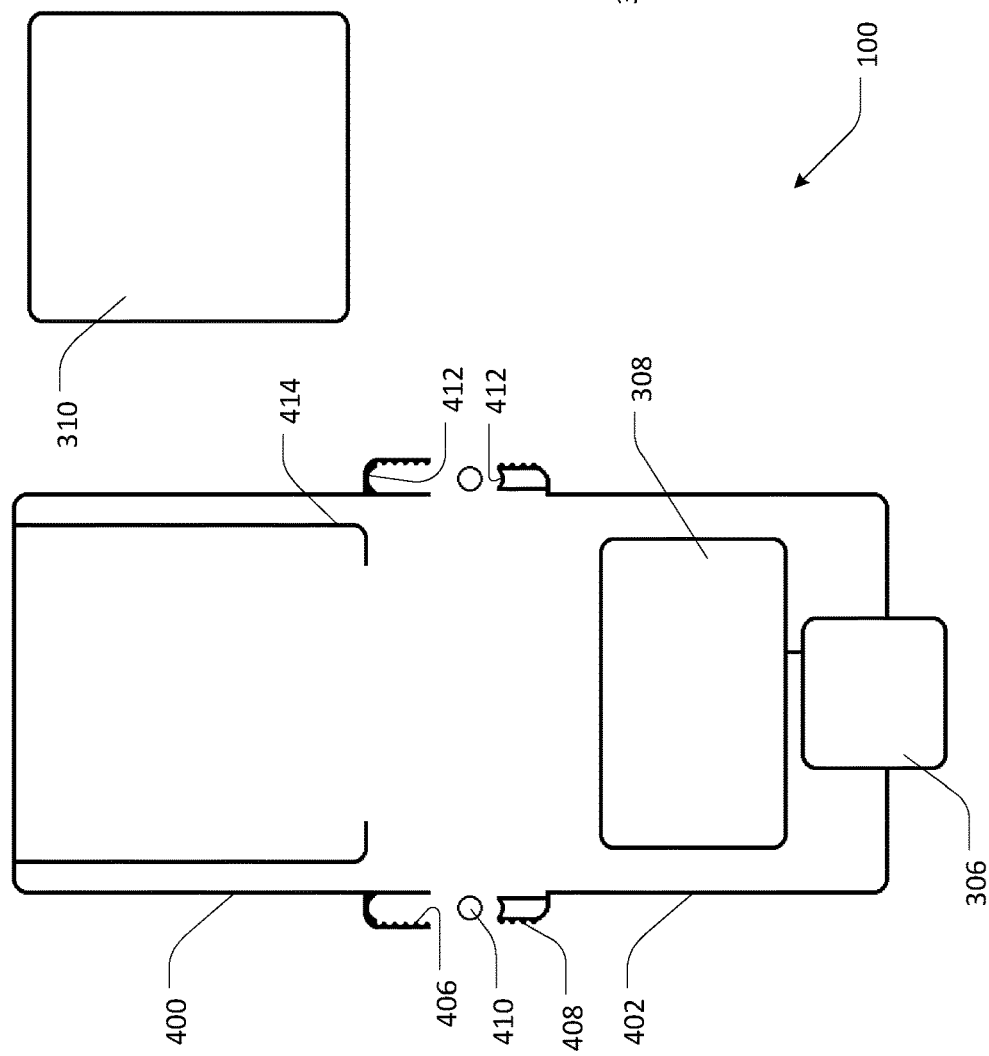
Figure 4B
Figure 4A

SYSTEMS AND METHODS FOR SEWER MONITORING

CROSS-REFERENCE TO RELATED APPLICATIONS

This application is a U.S. National Stage application under 35 U.S.C. § 371 of International Application PCT/AU2017/050722 (published as WO 2018/009976 A1), filed Jul. 13, 2017, which claims the benefit of priority to Application AU 2016902783, filed Jul. 15, 2016. Benefit of the filing date of each of these prior applications is hereby claimed. Each of these prior applications is hereby incorporated by reference in its entirety.

TECHNICAL FIELD

Described embodiments relate to systems and methods for sewer monitoring. Some embodiments relate to a sensor unit support structure for supporting a sensor unit in a manhole. Some embodiments relate to a sensor unit for sewer monitoring. Some embodiments relate to a sewer monitoring system comprising a sensor unit support structure and a sensor unit. Some embodiments relate to a method of installing a sewer monitoring system.

BACKGROUND

Known systems and methods for sewer monitoring are often expensive and difficult to install, inhibiting deployment on a large scale across a network, and may not enable a sufficiently accurate or detailed view of the sewer and sewer network to be formed.

Thus, in lieu of in-place monitoring systems, many organisations will organise a period audit of levels and flows, and then use this very limited snapshot to extrapolate vast infrastructure future demands and requirements.

It is desired to address or ameliorate one or more shortcomings or disadvantages associated with known systems and methods for sewer monitoring.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a sensor unit support structure for supporting a sensor unit in a manhole, the support structure comprising: an elongate beam adjustable along its length to span a width of the manhole and support the sensor unit within the manhole; first and second mounting brackets associated with respective first and second ends of the beam, each mounting bracket being configured to fasten the beam to an inner surface of the manhole; and first and second temporary brackets associated with respective first and second mounting brackets; wherein the first and second mounting brackets are configured to be removably coupled to respective first and second temporary brackets, each temporary bracket being configured to engage a rim of the manhole to allow the first and second mounting brackets to be positioned in the manhole and temporarily supported in position until the mounting brackets are fastened to the inner surface of the manhole.

In some embodiments, the sensor unit support structure comprises a hanger to couple the sensor unit to the beam, the hanger comprising a first coupling portion at a first end of the hanger configured to couple the hanger to the beam, and a second coupling portion at a second end of the hanger configured to couple the hanger to the sensor unit.

Some embodiments relate to a sensor unit support structure for supporting a sensor unit in a manhole, the support structure comprising: an elongate beam adjustable along its length to span a width of the manhole and support the sensor unit within the manhole; first and second mounting brackets associated with respective first and second ends of the beam, each mounting bracket being configured to fasten the beam to an inner surface of the manhole; and a hanger to couple the sensor unit to the beam, the hanger comprising a first coupling portion at a first end of the hanger configured to couple the hanger to the beam, and a second coupling portion at a second end of the hanger configured to couple the hanger to the sensor unit.

In some embodiments, the first and second mounting brackets are configured to be removably coupled to respective first and second temporary brackets, each temporary bracket being configured to engage a rim of the manhole to allow the first and second mounting brackets to be positioned in the manhole and temporarily supported in position until the mounting brackets are fastened to the inner surface of the manhole.

In some embodiments, the first and second temporary brackets are removably coupled to the first and second mounting brackets respectively. In some embodiments, the elongate beam is removably coupleable to the mounting brackets.

In some embodiments, each of the mounting brackets comprises a mounting pin configured to be received in an aperture defined in the beam near the associated end of the beam.

In some embodiments, each of the each mounting bracket comprises a fixing plate defining one or more apertures configured to receive mechanical fasteners to fasten the mounting bracket to the inner surface of the manhole.

In some embodiments, each of the first coupling portion comprises an adjustable clamp configured to allow the hanger to be slidable along the beam, and configured to selectively clamp the beam to fix the hanger at a selected position relative to the beam. For example, the clamp may comprise a hook, a clamping member, and a tightening mechanism configured to clamp the beam between the clamping member and the hook. In some embodiments, the clamping member comprises an elongate bar configured to clamp against the beam in substantially parallel alignment with the beam.

In some embodiments, the second coupling portion comprises an adjustable swivel joint configured to allow the sensor unit to be rotated with respect to the hanger, and configured to be selectively tightened to fix the sensor unit at a selected angle relative to the hanger.

Some embodiments relate to a sensor unit for detecting a selected characteristic in a manhole, the sensor unit comprising: one or more sensors; a controller communicatively coupled to the sensor; first and second casing portions configured to sealingly engage each other and cooperate to form a substantially water tight casing to accommodate the one or more sensors, the controller and a battery for supplying power to the sensor and the controller; and a battery clip at least partially disposed in one of the first and second casing portions, the battery clip configured to removably couple the battery to the casing, wherein the first casing portion is removable from the second casing portion to allow access to an inside of the casing for periodic removal and replacement of the battery.

In some embodiments, the sensor unit comprises the battery. In some embodiments, the sensor unit comprises a transceiver communicatively coupled to the controller to transmit data collected by the sensor unit.

In some embodiments, the sensor unit comprises one or more removable gaskets configured to engage and form a seal between the first and second casing portions. In some embodiments, the first and second casing portions are configured to threadedly engage one another to form the casing.

In some embodiments, the one or more sensors comprise an ultra-sonic sensor. In some embodiments, the sensor unit comprises at least one additional or second sensor. For example, the one or more additional or second sensors may comprise a gas detector configured to detect a concentration of a selected gas in the manhole.

In some embodiments, the controller comprises a processor and memory comprising a control module, which when executed by the processor is configured to determine fluid levels based on readings from the one or more sensors.

In some embodiments, the sensor unit is configured to operate in one of a plurality of modes, each mode associated with operations to be performed by the controller according to instructions of the control module.

For example, the control module, when executed by the processor, may be configured to determine a fluid level and/or flow rate of fluid in a chase of a manhole associated with the sensor unit.

Some embodiments relate to a sewer monitoring system comprising a sensor unit support structure according to any one of the described embodiments and a sensor unit according to any one of the described embodiments.

The sewer monitoring system of described embodiments is relatively easy to install and provides a relatively low cost solution for extensive deployment and network monitoring.

BRIEF DESCRIPTION OF DRAWINGS

Embodiments are described in further detail below, by way of example and with reference to the accompanying drawings, in which:

FIG. 4A is an exploded cross-sectional schematic illustration of a sensor unit of the sewer monitoring system of FIG. 2, according to some embodiments;

FIG. 4B is a cross-sectional schematic illustration of the sensor unit of FIG. 4A in an assembled state.

DESCRIPTION OF EMBODIMENTS

Described embodiments relate to systems and methods for sewer monitoring. Some embodiments relate to a sensor unit support structure for supporting a sensor unit in a manhole. Some embodiments relate to a sensor unit for sewer monitoring. Some embodiments relate to a sewer monitoring system comprising a sensor unit support structure and a sensor unit. Some embodiments relate to a method of installing a sewer monitoring system.

The sensor unit support structure is configured or suitable for supporting a sensor unit in a cavity, chamber, entrance, shaft, chimney, riser or access point such as a manhole, manway, sewer pit, sewer access or sewer neck, for example. The sensor units may be employed for detecting, measuring and/or monitoring one or more selected characteristics of interest of a sewer. In some embodiments, the sensor unit may be employed for detecting, measuring and/or monitoring sewage flow levels at an inspection location, sewer neck or manhole in a sewage flow network.

Figure 1:
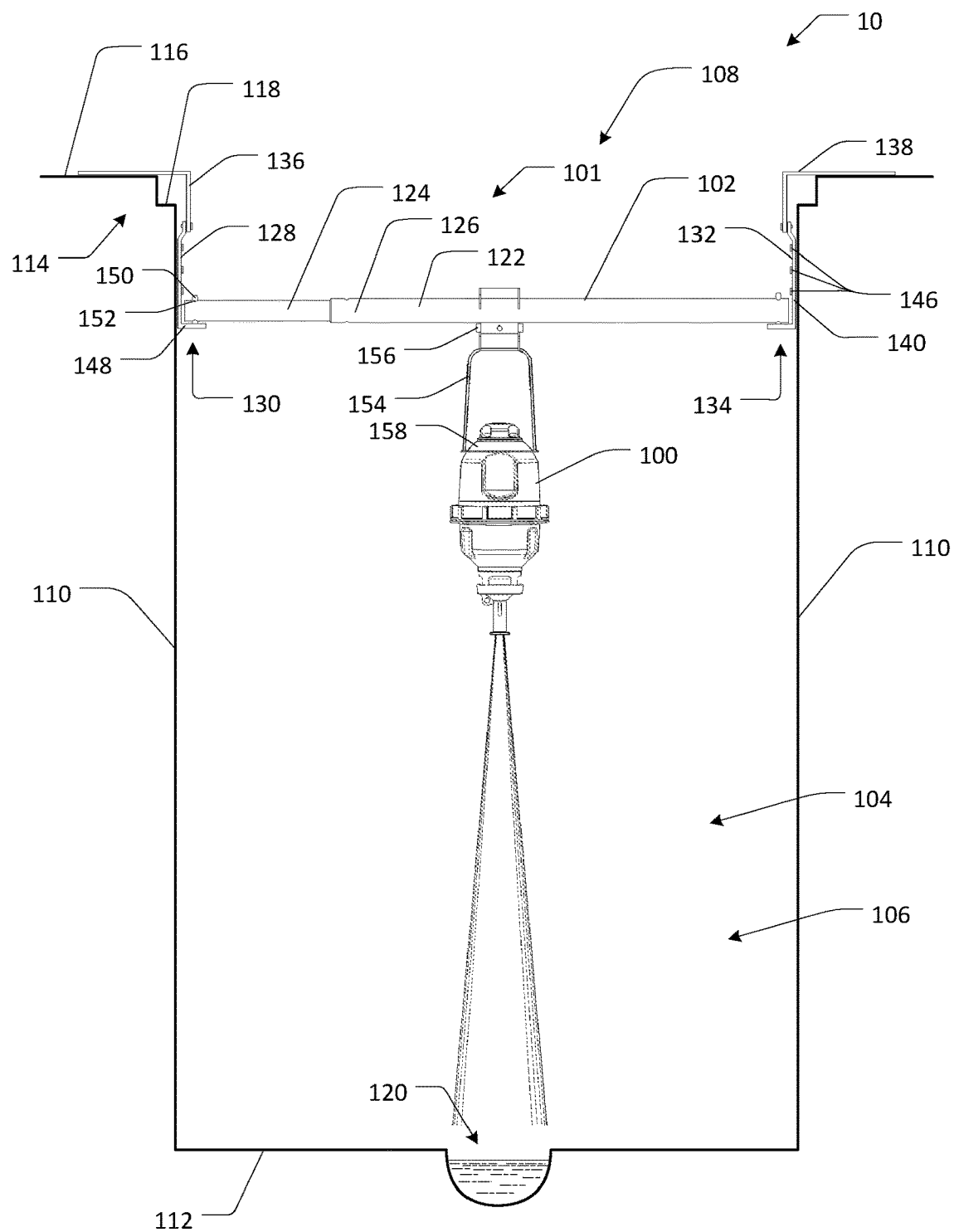
FIG. 1 is a schematic view of a sensor unit installation comprising a sewer monitoring system mounted within a manhole, according to some embodiments.

Referring to FIG. 1, a sensor unit installation 10 is shown according to some embodiments. The installation 10 comprises a sewer monitoring system 101 mounted within a manhole 104. The sewer monitoring system 101 comprises a sensor unit 100 supported by a sensor unit support structure 102.

As shown, the manhole 104 is defined by a subsurface cavity 106 having an opening 108 at or near ground level, one or more sidewalls 110 and a floor 112. The opening 108 may be defined by a rim 114 surrounding the opening 108. In some manholes 104, the rim 114 may comprise part of a ground level surface 116 immediately adjacent the opening 108. Additionally, or alternatively, the rim 114 may comprise a shoulder or seat 118 configured to receive and support a manhole cover (not shown).

Typically, manholes are designed for access to and inspection of sewer channels or 'chases' which run across the floor of the manhole cavity 106. As shown in FIG. 1, a channel or chase 120 is formed in the floor 112 running across the cavity 106 (out of plane in FIG. 1) between an inlet pipe (not shown) and an outlet pipe (not shown). The chase 120 may typically have a curved or round profile or a square or rectangular profile. In operation, sewage is conveyed or flows out of the inlet pipe into the chase 120 and along the chase 120 into the outlet pipe. A sewage flow rate can be calculated as a function of a height or level that the sewage rises to in the chase 120. In some embodiments, the sensor unit 100 may be configured to detect the sewage level in the chase 120 to allow the sewage flow rate to be determined.

Figure 2:
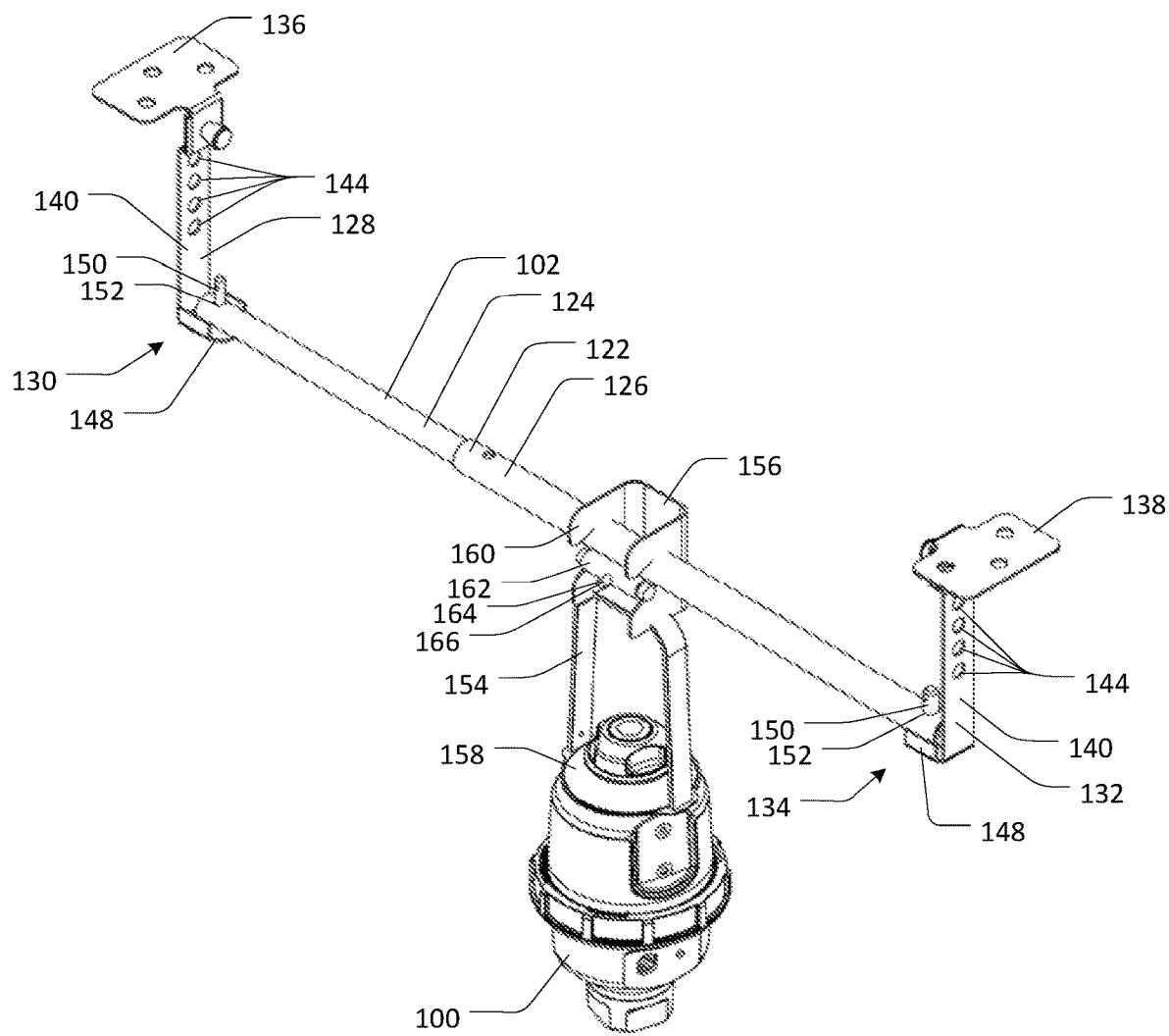
FIG. 2 is a schematic view of the sewer monitoring system of FIG. 1, according to some embodiments.

The sensor unit support structure 102 is also shown in FIGS. 2A to 2C. The support structure 102 may comprise an elongate beam 122 configured to span a width of the manhole 104 and support the sensor unit 100 within the manhole 104. The beam 122 may comprise any suitable rod or hollow section profile with sufficient strength and rigidity to support the sensor unit 100. In some embodiments, the beam 122 may be adjustable along its length to selectively span various manhole widths. In some embodiments, the beam 122 may comprise a first beam element 124 slidably receivable in a second beam element 126 to allow telescopic expansion and contraction of the beam 122 along its length so that the length of the beam 122 can be adjusted to span different widths of different manholes 104.

The support structure 102 may further comprise a first mounting bracket 128 associated with a first end 130 of the beam 122 and a second mounting bracket 132 associated with a second end 134 of the beam 122. Each mounting bracket 128, 132 may be configured to couple, secure or fasten the beam 122 to an inner surface or sidewall 110 of the manhole 104.

In some embodiments, the first and second mounting brackets 128, 132 may be configured to be removably coupled to respective first and second temporary brackets 136, 138. Each temporary bracket 136, 138 may be configured to engage the rim 114 of the manhole 104 to allow the first and second mounting brackets 128, 132 to be positioned in the manhole 104 and temporarily supported in position until the mounting brackets 128, 132 are fastened or otherwise secured to the inner surface or sidewall 110 of the manhole 104. In some embodiments, the temporary brackets 136, 138 may engage the ground level surface 116 surrounding the opening 108 of the manhole 104. In some embodiments, the temporary brackets 136, 138 may engage the manhole cover seat 118. For example, in some embodiments, the temporary brackets 136, 138 may be substantially L-shaped, with a first (longer or shorter) leg of each of the temporary brackets 136, 138 configured to extend along the ground level surface 116 and/or manhole cover seat 118 and a second (longer or shorter) leg of each of the temporary brackets 136, 138 configured to extend into the manhole 104 along the inner surface or sidewall 110 of the manhole 104. In some embodiments, the temporary brackets 136, 138 may engage both the ground level surface 116 and the manhole cover seat 118. For example, in some embodiments, the temporary brackets 136, 138 may be substantially L-shaped, with a first (longer or shorter) leg of each of the temporary brackets 136, 138 being stepped and configured to extend along and engage both the ground level surface 116 and the manhole cover seat 118 and a second (longer or shorter) leg of each of the temporary brackets 136, 138 configured to extend into the manhole 104 along the inner surface or sidewall 110 of the manhole 104.

Each mounting bracket 128, 132 may comprise a fixing plate 140 defining one or more apertures 142 configured to receive mechanical fasteners 146 to fasten the mounting bracket 128, 132 to the inner surface or sidewall 110 of the manhole 104. In some embodiments, the mounting brackets 128, 132 may be coupled to the temporary brackets 136, 138 for installation of the support structure 102 in the manhole 104. Once the mounting brackets 128, 132 are fastened to the sidewall 110, the temporary brackets 136, 138 may be removed from the mounting brackets 128, 132.

In some embodiments, the elongate beam 122 may be removably coupleable to the mounting brackets 128, 132. Each of the mounting brackets 128, 132 may comprise a beam seat 148 configured to support the first and second ends 130, 134 of the beam respectively. In some embodiments, the beam seats 148 may be substantially flat. In some embodiments, the beam seats 148 may have a rounded or U-shaped profile and be configured to accommodate part of each respective end 130, 134 of the beam 122.

In some embodiments, each of the mounting brackets 128, 132 may comprise a mounting pin 150 configured to be received in an aperture 152 defined in the beam 122 near the associated end 130, 134 of the beam 122. In some embodiments, the mounting pins 150 and/or beam seats 148 may be configured to allow some rotation of the mounting brackets 128, 132 with respect to the beam 122 so as to allow for mounting of the beam 122 at angles other than precisely normal to the sidewall 110. In some embodiments, the mounting pins 150 of each mounting bracket 128, 132 may each comprise a different shape, size or diameter corresponding to a shape, size and/or diameter of the respective apertures 152 near each end 130, 134 of the beam 122. This may help to ensure that when the beam 122 is removed from the mounting brackets 128, 132 by a user (for maintenance of the sensor unit 100, for example), the beam 122 can only be remounted in the correct orientation. That is, this feature may prevent a user from reversing the orientation of the beam 122, because each of the mounting pins 150 will only fit in its respective associated aperture 152.

The support structure 102 may further comprise a hanger 154 to couple the sensor unit 100 to the beam 122 and allow the sensor unit 100 to be suspended from the beam 122. The hanger 154 may comprise a first coupling portion 156 at a first end of the hanger 154 configured to couple the hanger 154 to the beam 122. For example, the first coupling portion 156 may comprise a clamp. The hanger 154 may comprise a second coupling portion 158 at a second end of the hanger 154 configured to couple the hanger 154 to the sensor unit 100. For example, the second coupling portion 158 may comprise a swivel joint.

In some embodiments, the first coupling portion 156 may comprise an adjustable clamp 156 configured to allow the hanger 154 to be slidable along the beam 122, and configured to selectively clamp or grip the beam 122 to fix the hanger 154 at a selected position relative to or along the length of the beam 122. The clamp 156 may allow for tool-less locking and may be adjustable by hand.

In some embodiments, the clamp 156 may comprise a hook 160, a clamping member 162, and a tightening mechanism 164 configured to clamp the beam 122 between the clamping member 162 and the hook 160. In some embodiments, the clamp 156 may comprise opposing clamping members resiliently biased towards each other to clamp the beam 122 and selectively releasable to allow the hanger 154 to be slidable along the beam 122.

In some embodiments, the hook 160 may comprise two arms configured to extend over and around part of the beam 122. The clamping member 162 may comprise an elongate bar configured to be arranged substantially parallel to the beam 122 to clamp the beam 122 against the hook 160. The tightening mechanism 164 may comprise a screw 166 engaged with the clamping member 162 and a body 168 of the clamp 156. In some embodiments, the screw 166 may be threadedly engaged with the clamping member 162 and coupled to the body 168 with a swivel joint (not shown). In other embodiments, the screw 166 may be threadedly engaged with the body 168 and coupled to the clamping member 162 with a swivel joint (not shown). In either case, rotation of the screw 166 will move the clamping member 162 towards or away from the hook 160, depending on the direction of rotation, and in this manner, the clamp 156 can be tightened onto the beam 122. In some embodiments, the screw 166 may have a standard head allowing the screw 166 to be rotated with an appropriate tool. In some embodiments, the screw 166 may have a wing type head or other head which is readily gripped and rotated manually without the use of a tool.

In some embodiments, the second coupling portion 158, configured to couple the hanger 154 to the sensor unit 100, may comprise an adjustable swivel joint configured to allow the sensor unit 100 to be rotated with respect to the hanger 154, and configured to be selectively tightened to fix the sensor unit 100 at a selected angle relative to the hanger 154. In some embodiments, the second coupling portions 158 may allow rotation of the sensor unit 100 in two or more directions relative to the hanger 154. For example, the second coupling portion 158 may comprise a ball joint. In some embodiments, the ball joint provides an approximate 10° range of motion in order to allow for accurate positioning of the sensor unit 100 relative to the chase 120.

In some embodiments, the sensor unit 100 may be provided with a magnetic laser pointer (not shown) to identify a desired or optimum position for the ultrasonic sensor of the sensor unit 100 relative to the chase 120 to allow for accurate measurements to be taken. For example, the magnetic laser pointer (not shown) may be configured to activate on contact with a level in a downwards position to avoid eye contact with an installer.

In some embodiments, the support structure 102 may be installed just below the opening 108 or a manhole cover (not shown) of the manhole 104. Such an installation may be performed by a single person and only requires that the person reach into the manhole 104. It does not require the person to climb into or fully enter a confined space, such as the manhole 104, and can be completed while the sewer system is in operation.

Figure 3:
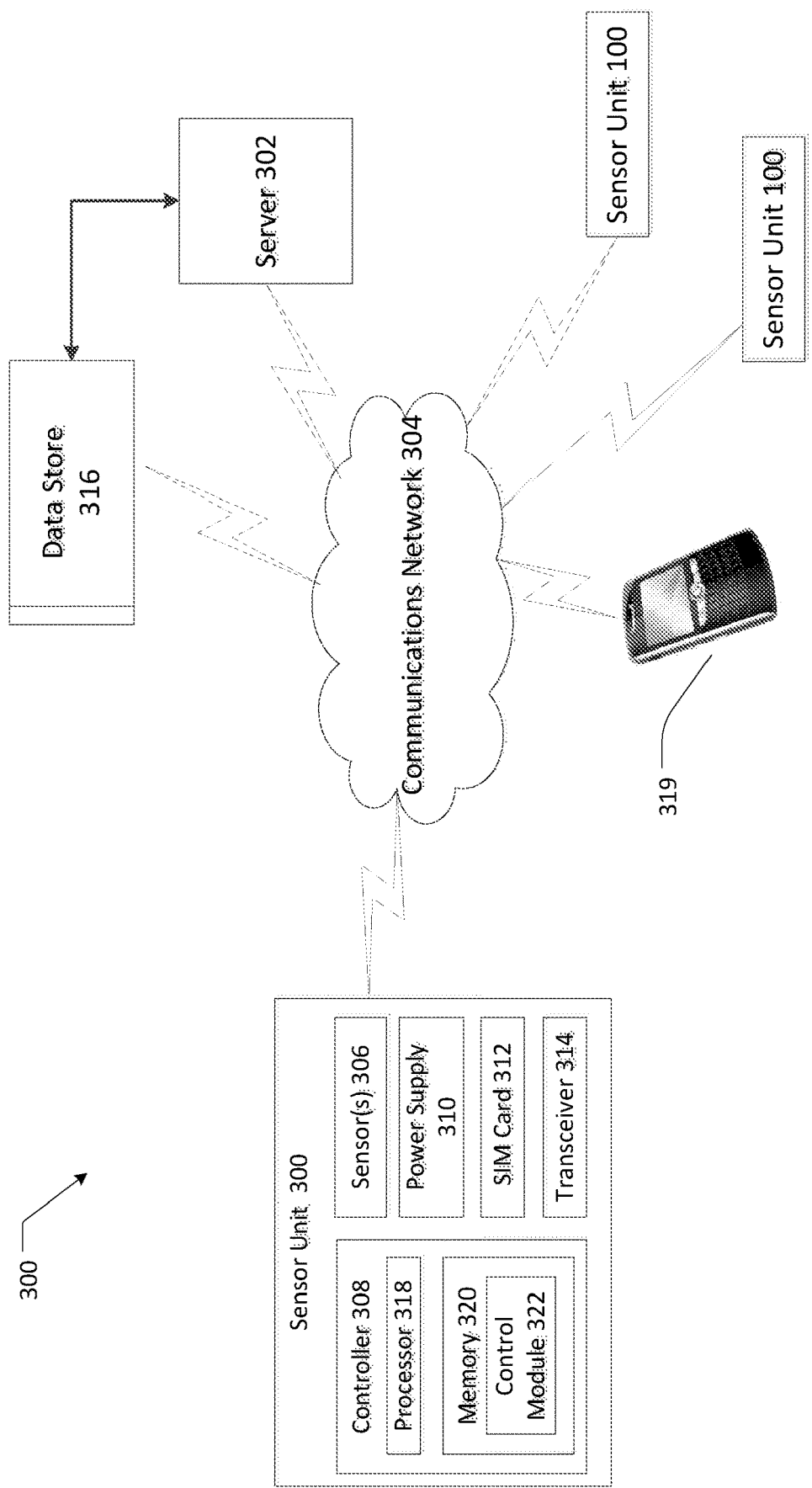
FIG. 3 is a block diagram of a communications system comprising a plurality of sensor units in communication with a server across a communications network, according to some embodiments.

Referring to FIG. 3, there is illustrated a communications system 300 comprising a plurality of sensor units 100 in communication with a server 302 across a communications network 304, according to some embodiments.

The sensor unit 100 may comprise one or more sensor(s) 306, a controller 308 communicatively coupled to the sensor(s) 306, and a power supply 310, such as a battery, configured to supply power to the sensor 306 and the controller 308. The sensor(s) 306 and power supply 310 may each be electrically coupled to the controller 308 by communication cables (not shown), for example. In some embodiments, the sensor unit 100 may comprise at least one subscriber identity module (SIM) card 312. The sensor unit 100 may comprise additional components and/or circuitry (not shown) as judged by a person of ordinary skill in the art to be necessary or desirable in order to carry out the functions described herein. For example, the sensor unit 100 may comprise analogue to digital or digital to analogue conversion circuits (not shown), function testing circuits, digital signal processing components and/or display components to provide feedback to the user. In one embodiment, the sensor unit 100 includes communications ports, for example, a multiple pin plug shell cable, such as a 6 or 9 pin plug shell cable, or USB ports, to allow for maintenance checks, data downloads, firmware upgrades, etc., as discussed in more detail below.

The sensor(s) 306 may be configured to detect any desired characteristic of interest, such as a level of a fluid flowing in a chase 120 of a manhole 104, for example. In some embodiments, the sensor(s) 300 may comprise an ultra-sonic sensor. In some embodiments, the sensor(s) 300 may comprise a camera. In some embodiments, the sensor(s) 300 may comprise a LASER distance sensor, such as a Doppler LASER distance sensor, for example.

In some embodiments, the sensor unit 100 may further comprise at least one additional or further sensor (not shown). The at least one additional sensor 306 may comprise a gas detector configured to detect a concentration of a selected gas in the manhole. For example, the selected gas may comprise any one or more of: hydrogen sulphide, methane, carbon dioxide, and any other gas of interest. The sensor(s) 306 and additional sensor may include at least one of a continuous sensor, such as an analogue sensor, a discrete sensor, such as a digital sensor, a level sensor, a pressure transducer, a laser sensor and an audio sensor. The sensor unit 100 may include analogue and/or digital input/output ports (to be shown) to accommodate the various sensor(s) 306. The sensor(s) 306 may include sensors to detect fluid levels, fluid flow, fluid pressure, noise, temperature, water quality, hydrogen sulphide distance, depth, humidity, gas concentrations and chemical concentrations, for example. The sensor(s) 306 may be used to detect other conditions and more than one type of sensor may be used to measure one type of condition (e.g. more than one water quality sensor may be used, such as conductivity, turbidity, PH levels and/or chlorine content sensors). Depending on what information is desired to be gathered, a sub-set of those sensors 300, 306 may be provided in the manhole 104. For example, it may be desired in some instances to measure fluid levels, fluid flow, fluid pressure and noise and in other instances to measure fluid levels, fluid flow, fluid pressure and water quality (e.g. chlorine content, turbidity and/or electrical conductivity).

In some embodiments, the sensor(s) 306 may comprise an ultra-sonic sensor. In some embodiments, the ultrasonic sensor may allow for elements in the manhole 104, such as tables, ladders etc. to be filtered out automatically so that only the condition of interest is recorded by the ultrasonic sensor 306. Mounting of the sensor unit 100 including the ultra-sonic sensor at or toward the opening 108 or cover (not shown) of the manhole 104, for example using the sensor unit support structure 102 may make it easier to install the sensor unit 100. For example, it may be installed by a single person without a need for confined space entry.

In some embodiments, the sensor unit 100 may further comprise a transceiver 314 communicatively coupled to the controller 308 to communicate with the remote server 302 across the communications network 304. For example, the sensor unit 100 may be configured to transmit data collected by the sensor unit 302 to the remote server 302 and/or to receive data from the remote server 302, such as operating instructions. For example, operating instructions and other data associated with the sensor unit 100 may be stored in a data store 316 accessible to the remote server directly and/or accessible to the remote server and/or the sensor unit 100 via the communications network 304. In some embodiments, the remote server 302 may comprise a Supervisory Control and Data Acquisition (SCADA) system.

The power supply 310 may comprise one or more batteries, such as a long-life battery having the capacity to supply operating power to the sensor unit 100 for a period of several years, for example up to about five years, before needing to be changed, assuming normal operation of the sensor unit 100 and normal operation of the power supply 310. The long life battery may comprise a lithium battery, for example. In other embodiments, the power supply 310 may comprise a replaceable battery. In some embodiments, the batteries may be configured in batches of multiple cells, such as 2 or 4 cells. The power supply 310 is arranged to provide power to the controller 308, the transceiver 210 and other circuitry within sensor unit 100, as appropriate. The power supply 310 may also provide power to the sensor(s) 306, for example, in response to power switching signals from controller 308. In some embodiments, the controller 308 further comprises a switching circuit (not shown) to control the transmission of the power switching signal to the power supply 310 for supplying power to the sensor(s) 306 and/or the transceiver 314.

The transceiver 314 may have a transmitting or a transmitting and receiving antenna (not shown) concealed within the sensor unit 100 and an outer casing part of the sensor unit 100 may be formed of a suitable non-conductive material to allow sufficient signal transmission strength out of and into the sensor unit 100. In other embodiments, an external antenna may be disposed on an outer casing part of the sensor unit 100 and/or on a cover (not shown) of the manhole 104. The transmitting and receiving antenna may be designed to be intrinsically safe (IS) by employing low current and voltage circuit components to thereby limit energy available that may cause a spark and become an ignition source. In some embodiments, the transceiver 314 may be configured to transmit data to the server 302 using the GSM or GPRS/3G standards for mobile telephony or their technological successors. For example, the transceiver 314 may be a quad band transceiver capable of tuning into GSM 850, GSM 900, GSM 1800, and GSM 1900. In other embodiments, the transceiver 314 may be a dual-band or a tri-band transceiver 314. In other embodiments, the transceiver 314 may be configured to transmit data to the server 302 using packet routing protocols. In some embodiments, the transceiver 314 may be configured to transmit data to the server 302 such as data comprising measurements received from the sensor(s) 306, parameters associated with the chase 120 and/or manhole 104, and/or values calculated by the controller 308, for example, the flow rate in the chase 120 and/or manhole 104.

In some embodiments, the sensor unit 100 may be configured to connect to one or more IP networks, such as low power wide area networks or low power personal area networks, to communicate with the server 302. For example, IPv6 over Low power Wireless Personal Area Networks (6LoWPAN) may be used to connect the sensor unit 100 to the one or more IP networks to allow the sensor unit 100 to transmit data to and receive data from the server 302.

In some embodiments, the sensor unit 100 may comprise at least two SIM cards 312 as a back-up or fail-safe measure. For example, a first SIM card may be associated with a first communication network provider and a second SIM card may be associated with a second and different mobile (e.g., GPRS) communication network provider. Thus, if a data connection cannot be established using a first SIM card, or the first SIM is deemed otherwise inoperable, the processor 318 may be arranged to cause the controller 308 to interact with the second SIM card in order to establish a data connection and transmit and/or receive messages wirelessly using transceiver 314. In some embodiments, at least one of the two SIM cards 312 is a SIM card embedded within the sensor unit 100, for example, forming part of the permanent electronics of the sensor unit 100. For example, the at least one of the two SIM cards 312 may be a GSMA™ Embedded SIM which allows for remote provisioning and management of machine-to-machine (M2M) connections.

In some embodiments, the sensor unit 100 may be configured for low power consumption and may be designed to be intrinsically safe (IS) by employing low current and voltage circuit components to thereby limit energy available that may cause a spark and become an ignition source.

The sensor unit 100 and/or the server 302 may be in communication with one or more computing device 319 across the communications network 304. For example, the controller 308 of the sensor unit 100 and/or the server may be configured to transmit an alarm notification to the computing device 319 in the event that a potential spills or leaks are detected to allow for preventative maintenance actions to be taken.

As depicted in FIG. 3, the controller 308 may include a processor 318 (or multiple processing components operating together) and memory 320. Memory 320 may comprise a combination of volatile and non-volatile computer readable storage and may have sufficient capacity to store program code executable by processor 318 in order to perform appropriate processing functions as described herein. For example, memory 320 may include a control module 322 comprising program code, which when executed by the processor 318 may be arranged to cause the controller 308 to interact with at least one SIM card 312 as necessary in order to establish a remote data connection to transmit and/or receive data or messages wirelessly using transceiver 314 and to control the sensor(s) 306. In some embodiments, the control module 322 may comprise program code, which when executed by the processor 318 is arranged to cause the controller 308 to switch power on and off to the sensor(s) 306, to thereby conserve power consumption. In some embodiments, the controller 308 may be arranged or configured to receive operating instructions for operating the sensor(s) 306, for example, via transceiver 314, to allow for remote control of and adjustment of settings associated with the sensor(s) 130. Further detailed embodiments are disclosed in International (PCT) patent application no. PCT/AU2015/050519, the entire content of which is incorporated herein by reference.

In some embodiments, the sensor(s) 306 may be arranged to measure fluid levels in the chase 120 and/or manhole 104 in engineering units, such as meters, and survey level (height above sea level), such as Australian Height Datum (AHD) or (mAHD). The sensor unit 100 may be configured to receive data comprising the measurements from the sensor(s) and the controller 308 may be configured to calculate a flow rate in the chase 120 and/or manhole 104 based on the received data and on parameters associated with chase 120 and/or manhole 105, as discussed in further detail below.

In some embodiments, the sensor unit 100 may be configured to operate as a level-sensor device and to monitoring sewage flow levels within typical manhole-accessed maintenance and inspection locations along sewage flow networks. For example, the sensor unit 100 may be employed to support early detection of potential spills, leak detection in rising mains, for preventative maintenance activity, and for flow monitoring enabling future infrastructure planning Data received from sensor(s) 306 may be transmitted by the controller 308 to the server 302 for processing. In some embodiments, the sensor(s) 306 and controller 308 may be configured to transmit relatively high number of data points at high frequency continuously (or sufficiently frequently so as to be considered substantially continuously) to thereby allow the server to determine an accurate picture of level and/or flow of fluid in the chase 120 and/or manhole 10. In some embodiments, the data may be used to provide early warnings and to trigger alarms, such as to computing device 319. In some embodiments, the server 302 may employ data received from the sensor unit 100 to determine preventative or maintenance activity; to detect potential spills; to detect leaks in rising mains, to detect H2S and for flow modelling purposes. For example, data collected may be used to form accurate models for local and regional flows, leading to more reliable management of flows and more accurate future infrastructure plans. In some embodiments, when monitoring for unusual events in a sewage network, data from multiple sensor units 100 may be employed by the server 302 to accurately narrow down the location of an issue(s) relating to the unusual event.

Referring now to FIGS. 4A and 4B, there is illustrated the sensor unit 100 according to some embodiments. The sensor unit 100 may comprise a first casing portion 400 and a second casing portion 402. The first and second casing portions 400, 402 may be configured to sealingly engage each other and cooperate to form a substantially water tight or water proof casing 404. For example, the casing 404 may comply with IP68 and comprise a sealing which provides two levels of protection to the electronics modules housed within the sensor unit 100.

The first and second casing portions 400, 402 may be configured to accommodate at least the sensor 306, controller 308 and battery 310 of the sensor unit 100. The first casing portion 400 may be removable from the second casing portion 402 to allow access to an inside of the casing 404 for periodic removal and replacement of the battery 310.

In some embodiments, the first and second casing portions 400, 402 may be configured to threadedly engage one another to form the casing 404. For example, the first casing portion 400 may comprise a cylindrical female threaded portion 406 and the second casing portion 402 may comprise a complementary cylindrical male threaded portion 408 configured to engage the female threaded portion 406. In some embodiments, the first casing portion 400 may comprise the male threaded portion 408 and the second casing portion 402 may comprise the female threaded portion 406.

In some embodiments, the sensor unit 100 may further comprise one or more removable gaskets 410 configured to engage and form a seal between the first and second casing portions 400, 402. In some embodiments, the first and/or second casing portions 400, 402 may define one or more gasket seats 412 configured to engage the one or more removable gaskets 410 to seal the casing 404. In some embodiments, Gortex membranes may be ultra-sonically bonded to an exterior of the casing 404 to protect the casing 404 and the sensor unit 100 from ingress.

In some embodiments, the sensor unit 100 may further comprise a battery clip 414 at least partially disposed in one of the first and second casing portions 400, 402. The battery clip 414 may be configured to removably couple the battery 310 to the casing 404.

In some embodiments, the sensor unit 100 is composed of materials configured to withstand corrosive environments. For example, the first and second casing portions 400, 402 of the sensor unit 100 may be formed of corrosion resistant materials such as polyvinyl chloride, polypropylene and polyethylene, for example. Accordingly, the sensor unit 100 is designed to withstand the relatively hostile environment of a sewer and may be substantially resistant to characteristics such as high relative humidity and corrosive and potentially explosive gases.

In some embodiments, the casing 404 is intrinsically safe (IS) and is made from an electrically conductible polypropylene polymer that allows for static to discharge from the electronic components within the sensor unit 100, to ground. In some embodiments, the casing 404 and/or sensor unit 100 is provided with venting (not shown) to mitigate internal gas build-up, for example, as may be produced by the batteries 310.

In some embodiments, the control module 322 of the sensor unit 100 comprises an application for determining a fluid level and/or fluid flow rate for example, in the chase 120 of the manhole 104 in which the sensor unit 100 is installed.

The application may rely on a plurality of pre-defined or user-selectable parameters to perform level/flow detection calculations. These parameters may be locally in memory 320 of sensor unit 100 or remotely in data store 316 or at server 302, for example. Default values may be associated with at least some of the parameters. In some embodiments, a user may be capable of defining and/or selecting at least some of the parameters using a user interface (not shown) of the sensor unit 100 and/or accessing a server-side configuration application using a computing device, such as computing device 319. For example, a user may be allowed to define values for parameters and/or may be provided with options, such as a drop down menu of selectable options.

In some embodiments, the parameters may include communication based parameters, such as a sampling time for taking fluid level readings, a transmission tome for transmitting data from the sensor unit 100.

Figure 5:
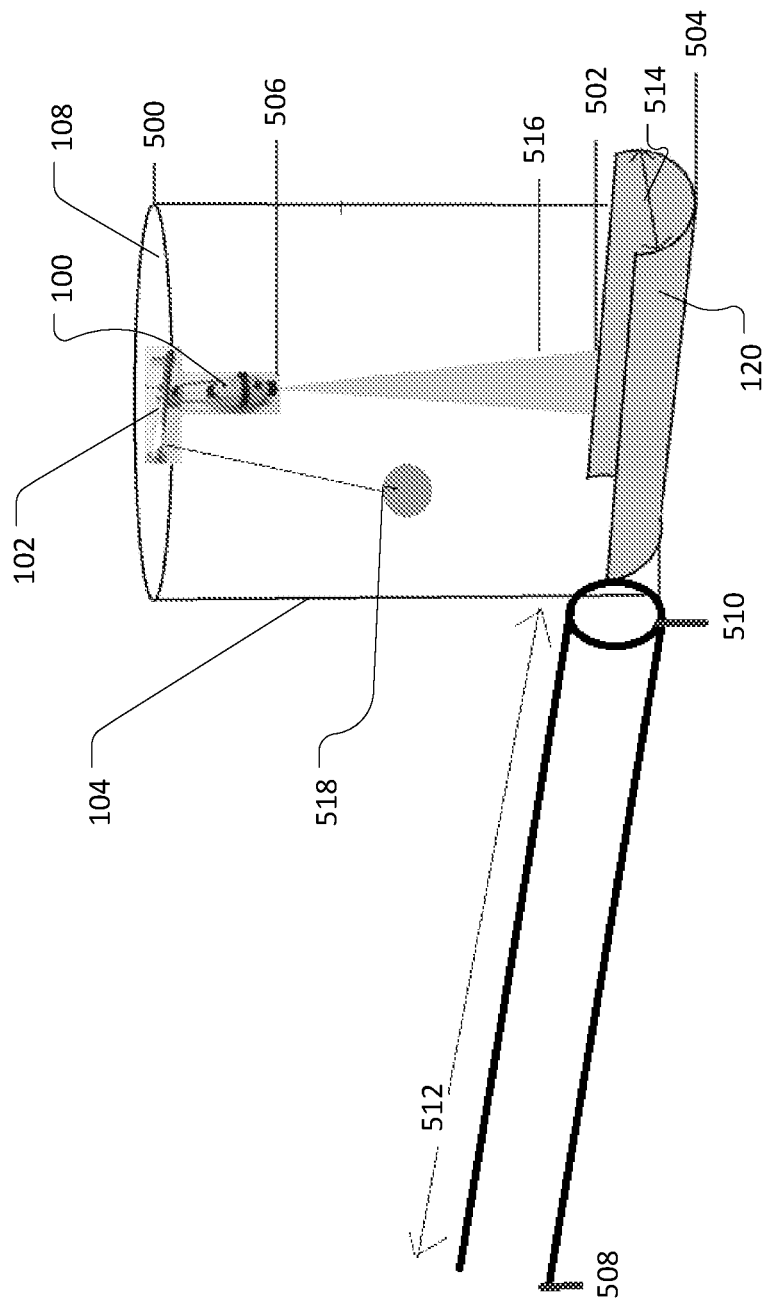
FIG. 5 is a graphical representation depicting levels within the manhole of FIG. 1.

In some embodiments, the parameters may include environment dependent parameters as illustrated in FIG. 5. The environment dependent parameters may comprise manhole depth (for example, in meters), manhole cover or opening 108 level 500 (for example, in mAHD), table/floor level 502, i.e., a benching level at or just above the chase 120 (for example, in mAHD), a bottom or surface level 504 of the chase 120 (for example, in mAHD), sensor face level 506 (for example, in mAHD), an upstream invert level 508 of incoming pipe segment of an upstream sewer channel pipe (for example, in mAHD), a downstream invert level 510 of incoming pipe segment of a downstream sewer channel (for example, in mAHD), length 512 of incoming pipe segment (for example, in meters), pipe roughness, and/or sewer channel width 514 (for example, in meters).

In some embodiment, the parameters may include HIGH alarm level 516, (for example, in mAHD), and the controller 308 may be configured to trigger an alarm should fluid levels in the manhole 104 breach the HIGH alarm level 516. For example, the controller 308 may be configured to transmit an alarm notification to the computing device 319 and/or server 302. In some embodiment, the sensor unit 100 may further comprise a float switch 518 associated with a default or user-definable "SPILL" level, which if breached, may cause the controller 308 to transmit an alarm notification to the computing device 319 and/or server 302. In some embodiments, the HIGH alarm level and SPILL" level may be associated with DNP3 binary input points for transmission to the SCADA system, for example, while other analog/digital event data is being transmitted simultaneously via an IIN flag.

The sensor unit 100 may be configured to determine and log fluid level in meters and/or mAHD. For example, the level application, when executed by processor 318, may be configured to cause the controller 308 to determine and log the fluid level in the chase 120.

The following equations may be employed to determine fluid level, where target is a level of fluid in chase 120 and range is a distance from the sensor face:

Fluid level (mAHD)=(range to table level (m))–
(range to target (m))+(table level (mAHD)

Fluid level (m)=fluid level (mAHD)–bottom of
chase level (mAHD)

In some embodiments, sensor unit 100 may be configured to determine and log fluid velocity or flow rate. For example, the level/flow detection application, when executed by processor 318, may be configured to cause the controller 308 to determine and log fluid velocity or flow rate of fluid in the chase 120.

The following equations may be employed to determine fluid velocity:

$$\text{Fluid velocity} = -4\sqrt{2gRS}\,\log_{10}\left(\frac{k}{14.8R} + \frac{0.314v}{R\sqrt{2gRS}}\right)$$

Where g, the gravitational constant is 9.81m/s$^2$; S is the slope of the upstream pipe, and which may be calculated as ([upstream pipe segment invert level−downstream pipe segment invert]/pipe length]); v is the kinematic viscosity of water (99% of the sewage is water) and is defined as 0.000001 kg/(m.s); k is the roughness of the upstream pipe material (for example, "PlastiLine" concrete as a k value of 0.0006m); and R is the hydraulic radius.

Figure 6:
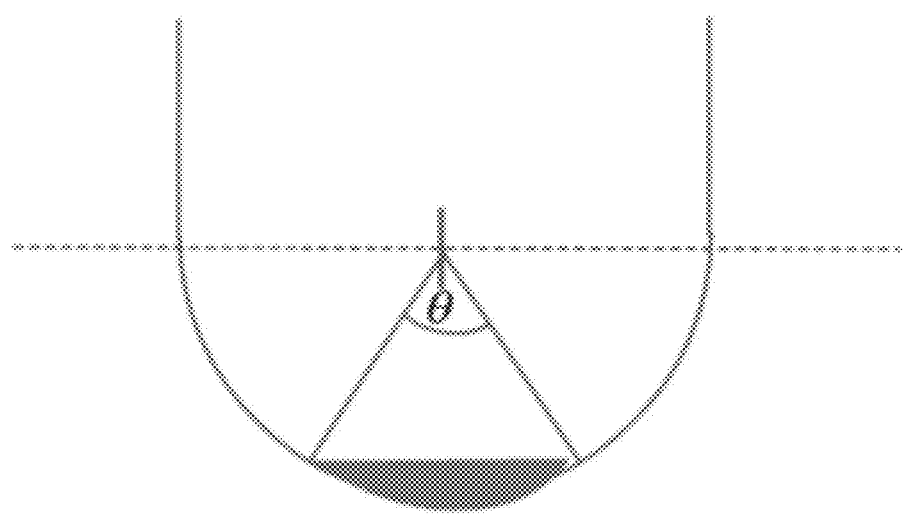
FIG. 6 is a graphical illustration of an exemplary wetter area of a chase.

As illustrated in FIG. 6, the wetted area of chase may be calculated as $$A = \frac{r^2}{2}(\theta - \sin\theta),$$

where r is the chase radius and $$\theta = \arccos\left(\frac{r-h}{r}\right)^2.$$

The wetted perimeter (edge of wetted area that is in contact with the chase wall) may be calculated as $r\theta$. The hydraulic radius R may be calculated as wetted area of chase/wetted perimeter:

$$R = \frac{r}{2}\left(1 - \frac{\sin\theta}{\theta}\right).$$

For example, flow rate may be defined as:

$$\text{Flow rate} = -4\sqrt{2gRS}\,\log_{10}\left(\frac{k}{14.8R} + \frac{0.314v}{R\sqrt{2gRS}}\right)A\;1000$$

where g=9.81; k=0.0006; v=0.000001;

$$A = \frac{r^2}{2}(\theta - \sin\theta); \theta = \frac{2}{\cos\left(1 - \frac{h}{r}\right)};$$

r=chase radius (m); h=sewer level (m);

$$R = \frac{r}{2}\left(1 - \frac{\sin\theta}{\theta}\right);$$

S=slope or me upstream pipe entering manhole; and 1000 to convert m³ to litres.

In some embodiments, the sensor unit 100 may approximate the flow rate by employing the Manning equation or Gauckler-Manning-Strickler formula which is defined as $$V = \frac{k}{n}R_h^{2/3}S^{1/2},$$

where: V is the cross-sectional average velocity n, is the Gauckler-Manning coefficient, $R_h$ is the hydraulic radius, S is the slope of the hydraulic grade line or the linear hydraulic head loss, and k is a conversion factor between SI and English units. For example, k=1 for SI units, and k=1.49 for English units.

In some embodiments, the server 302, as opposed to or in addition to the sensor unit 100 is configured to determine the fluid velocity or flow rate based on fluid level data received from the sensor unit 100.

In some embodiments, the sensor unit 100 is configured to operate in a plurality of different modes. The control module 322 may comprise computer code, which when executed by processor 318, causes the sensor unit 100 to operate in a select one of the modes. For example, the modes may include a flow/level detection mode, a fast sample acquisition mode or "Rising Main DNA mode", a long life level detection mode or "Blokaid mode", "Rising Main Leak Detection mode" and "Ingress and/or Infiltration Detection mode". A user may configure the sensor unit 100 to operate in any one of the plurality of modes. For example, when the sensor unit 100 is configured to operate in the flow/level detection mode, the sensor unit 100 may be configured to determine and log fluid levels and/or flow rates of fluid in the chase 120 of the manhole 1-04 in which the sensor unit 100 is installed. When the sensor unit 100 is configured to operate in the fast sample acquisition mode, the sensor unit 100 may be configured to determine fluid levels only as may be calculated using the above identified formulas.

When the sensor unit 100 is configured to operate in the long life level detection mode, the sensor unit 100 may be configured to detect surcharging in the manhole and send an alert to the server 302 and/or other computing devices 319. When operating in the long life level detection mode, the controller 308 may be configured to log fluid level readings only if the float switch 518 is activated to thereby conserve battery life. Further detailed embodiments of a sensor unit 100 configured to operate in this mode are disclosed in International (PCT) patent application no. PCT/AU2015/050519, the entire content of which is incorporated herein by reference. It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A sensor unit support structure system for supporting a sensor unit in a manhole, the support structure system comprising:
    an elongate beam adjustable along its length to span a width of the manhole and support the sensor unit within the manhole, the elongate beam having a first end and a second end opposing the first end;
    first and second mechanical fasteners configured to be embedded into an inner side of the manhole;
    first and second mounting brackets removably mountable to the first and second mechanical fasteners, respectively, on an inner surface of the manhole, wherein the first end of the elongate beam is configured to couple with the first mounting bracket and the second end of the elongate beam is configured to couple with the second mounting bracket so as to fasten the elongate beam to the inner surface of the manhole; and
    a hanger to couple the sensor unit to the beam, the hanger comprising
    a coupling portion at a first end of the hanger configured to couple the hanger to the beam, the coupling portion comprising a hook having two arms configured to extend over and around the elongate beam, and
    an adjustable swivel-joint coupling portion at a second end of the hanger configured to couple the hanger to the sensor unit so that the sensor unit is rotatable relative to the hanger in two or more directions, and wherein the adjustable swivel-joint coupling portion is configured to be movable relative to the hanger in a 10° range of motion from a vertical axis of the hanger.

2. The sensor unit support structure system according to claim 1, wherein the first and second mounting brackets are configured to be removably coupled to first and second temporary brackets, respectively, each temporary bracket being configured to engage a rim of the manhole to allow the first and second mounting brackets to be positioned in the manhole and temporarily supported in position until the first and second mounting brackets are fastened to the inner surface of the manhole.

3. The sensor unit support structure system according to claim 2, further comprising the first and second temporary brackets removably coupled to the first and second mounting brackets respectively.

4. The sensor unit support structure system according to claim 1, wherein the elongate beam is removably coupled to the first and second mounting brackets.

5. The sensor unit support structure system according to claim 1, wherein each of the first and second mounting brackets comprises a mounting pin configured to be received in an aperture defined in the beam near the an associated end of the beam.

6. The sensor unit support structure system according to claim 1, wherein each mounting bracket comprises a fixing plate defining one or more apertures configured to receive mechanical fasteners to fasten the mounting bracket to the inner surface of the manhole.

7. The sensor unit support structure system according to claim 1, wherein the coupling portion comprises an adjustable clamp configured to allow the hanger to be slidable along the beam, and configured to selectively clamp the beam to fix the hanger at a selected position relative to the beam.

8. The sensor unit support structure system according to claim 7, wherein the adjustable clamp comprises a hook, a clamping member, and a tightening mechanism configured to clamp the beam between the clamping member and the hook.

9. The sensor unit support structure system according to claim 8, wherein the clamping member comprises an elongate bar configured to clamp against the beam in parallel alignment with the beam.

10. The sensor unit support structure system according to claim 1, wherein the adjustable swivel-joint is a ball joint.

11. A sewer monitoring system, comprising:
the sensor unit support structure system according to claim 1; and
the sensor unit, wherein the sensor unit is for detecting a selected characteristic in a manhole, the sensor unit comprising:
an ultrasonic sensor;
a controller communicatively coupled to the ultrasonic sensor;
a water tight housing configured to accommodate the ultrasonic sensor and the controller, and wherein the controller is configured to:
obtain an output from the ultrasonic sensor,
apply a filter to remove output associated with interfering elements of the manhole, and
determine a fluid level and a flow rate of fluid in a chase of the manhole based on the filtered output.

12. The sewer monitoring system according to claim 11, further comprising a removable battery.

13. The sewer monitoring system according to claim 11, further comprising a transceiver communicatively coupled to the controller for transmitting data to a remote server.

14. The sewer monitoring system according to claim 11, wherein the housing comprises first and second opposing portions and a removable gasket configured to engage and form a seal between the first and second opposing portions.

15. The sewer monitoring system according to claim 11, further comprising a gas detector sensor configured to detect a concentration of hydrogen sulphide in the manhole.

16. The sewer monitoring system according to claim 11, wherein the controller is further configured to operate in a power conservation mode in which data sampling of the ultrasonic sensor is limited to only when a corresponding float switch monitoring a fluid level of the manhole is activated to indicate that a fluid level has surpassed a predetermined threshold level.

17. The sewer monitoring system according to claim 16, wherein the controller is configured to operate in any one of (1) the power conservation mode, (2) a normal sample acquisition mode, and (3) a fast sample acquisition mode.

18. The sewer monitoring system according to claim 11, wherein the controller is further configured to trigger an alarm at a remote server based on the determined flow rate and/or fluid level exceeding a predetermined threshold.

* * * * *